Patented Sept. 24, 1940

2,215,603

UNITED STATES PATENT OFFICE 2,215,603

AGRICULTURAL INSECTICIDE

Leo M. Christensen and Harry Miller, Atchison, Kans., assignors to The Chemical Foundation, Incorporated, a corporation of Delaware No Drawing. Application February 17, 1938, Serial No. 191,114

6 Claims. (Cl. 167—48)

This invention relates to improvements in insecticides, more particularly to the production of an improved argricultural insecticide.

As is known, the protection of growing crops against the attacks of insects, such as grasshoppers, locusts, and other chewing and sucking pests, is an agricultural problem of major importance. This problem is particularly accentuated in some areas, such as the Middle West, where, under special meteorological conditions, certain pests, such as the grasshoppers, may develop in such tremendous numbers as to constitute a plague. Such a condition obtained in 1937. The damage caused by this plague has been estimated to amount to eighty million dollars.

In the past, many methods of crop protection have been suggested and employed. Such methods include, the spraying of toxic dust from airplanes, the construction of fire trenches, and the use of baits. Of these various methods, the use of the bait or insecticidal mash is most widely employed and, everything considered, is the most effective. For the most part, such baits comprise a mixture of bran and an arsenical, or one of bran and magnesium sulfate. In use, such baits are made up as a mash with water and molasses and are spread over the area to be protected. The arsenical mashes are quite toxic and effective but, due to the arsenical component, are relatively expensive. The magnesium sulfate mashes, on the other hand, while considerably less expensive, are not as effective as the arsenicals.

As a result of considerable experimentation, we have found that the effectiveness of the magnesium sulfate insecticides may be very markedly increased, and such increased effectiveness may be secured in a very simple manner and by utilizing cheap materials.

In the study of the effect of different types of insecticides on pests, it was determined that, other things being equal, these pests evidenced a preference for the moist or succulent foods. It was further found that the typical magnesium sulfate mashes, while quite effective for a brief period after application, appeared to lose their effectiveness very quickly, especially in warm, dry weather. As a result of a series of tests, it was further determined that this diminished effectiveness was due to the fact that the bait tended to dry out during the warm hours of the day.

Based upon these findings, there was then developed a method of insuring the continued effectiveness of magnesium sulfate, and similar mashes, even under the conditions which heretofore have rendered them ineffective, namely, under weather conditions which tended to dehydrate or dry out such mashes.

The new method, briefly stated, comprises the incorporation, in the mash, of a special addition agent which is characterized by a marked hygroscopicity and water retentivity. After considerable experimentation, it was determined that calcium chloride was a very effective agent of this class. Since calcium chloride is a readily available, cheap, waste product, it constitutes an ideal addition agent. However, it will be appreciated that, within the scope of the invention, other substances may be utilized, such as hygroscopic polyhydric alcohols, of the type of glycerin, hygroscopic glycerin derivatives, such as ethylene glycol, and the like. In fact, any substance may be employed which has a marked affinity and retentivity for water under the conditions of use and which has no substantial inhibitive effect on the insecticidal value of the magnesium sulfate, or equivalent toxic agent.

In carrying out the invention, it is necessary that the quantity of the hygroscopic addition agent should not exceed those limits beyond which it reduces the effectiveness of the essential toxic agent. In most circumstances, such quantities may vary over relatively wide limits and, in any particular case, may readily be determined empirically. When non-ionized or weakly ionized addition agents are employed, the permissive range of the addition agent is very broad.

The advantages accruing from the use of the invention will be more readily appreciated from a consideration of typical illustrative examples. To determine the comparative efficacy of older forms of baits, and those made in accordance with the present invention, feeding tests were conducted. In such tests a predetermined feed or bait was made up and placed in a cage, together with a given number of insects; in the illustrative tests, grasshoppers were employed. The cages were submitted to the prevailing weather conditions and the insects allowed to feed for a period of 48 hours. At the end of this period, the fatality, based on dead and inactive grasshoppers, was then determined and taken as the index or measurement of the insecticidal effectiveness of the particular feed.

In one cage there was placed a mixture of green corn leaves, which were immersed in water, and a typical magnesium sulfate mash. This mash consisted of 40 parts of bran, 25 parts of magnesium sulfate, 4 gallons of water, and 1 gallon of molasses. The bran and sulfate were first mixed in the dry state and 2 gallons of the water added; thereafter, the remaining 2 gallons of water, mixed with the molasses, were stirred into the mash. Sixteen grasshoppers were placed in the cage. After 48 hours, it was found that 6 grasshoppers were dead, 4 were inactive, while 6 were seemingly unaffected. In this test, therefore, the fatality, based on dead and inactive grasshoppers, was 55 per cent.

A number of similar tests were conducted to determine the effective range of the calcium chloride addition agent. In these tests, the bran was made up in the manner previously described, except that the calcium chloride employed was dissolved in the water used to pulp the bran.

In one such test a feed was made up of green corn leaves and a bran mash which contained 25 per cent. of salts (dry basis), such salt mixture being composed of 1 part of magnesium sulfate and 1 part of calcium chloride. Eighteen grasshoppers were placed in a cage. After 48 hours, it was found that 5 grasshoppers were dead, 4 were inactive, and 9 were apparently unaffected. The fatality, based on the dead and inactive grasshoppers, therefore, was 50 per cent.

It will be noted that this particular mixture was less effective than the typical magnesium sulfate mash which contained no calcium chloride. This test, confirmed by a number of similar tests, demonstrated the fact that high concentrations of the calcium chloride have an inhibitive effect on the toxic efficiency of the magnesium sulfate. It was found that the calcium ion, within certain concentrations, has an antagonistic action toward the magnesium ion. When, however, the calcium chloride is used within certain ranges, the insecticidal efficiency of the bran is markedly increased. As a result of a number of experiments and field tests, it was found that the calcium chloride may be added up to substantially 10 per cent. (dry basis) of the bran.

The marked improvement in the efficiency of this type of bait, due to the utilization of smaller percentages of the calcium chloride, is illustrated by the following typical example. A mash was made up, as described in the second example, which contained 25 per cent. of salts, such salts being comprised of 3 parts of magnesium sulfate and 1 part of calcium chloride. Twenty-nine grasshoppers were placed in a cage and allowed to feed for 48 hours. At the termination of this period it was found that 12 of the grasshoppers were dead, 9 were inactive, and 8 apparently unaffected. The fatality, based on the dead and inactive grasshoppers, was 72 per cent.

These tests were corroborated by actual field tests conducted during hot, dry periods. Such field tests definitely established the increased killing power of the novel baits. It may be observed, at this point, that, in ordinary circumstances, grasshoppers feed early in the morning, after sunrise, and again in the evening after sunset. Concurrent use and examination of the novel baits and the older forms clearly demonstrated that, whereas the older baits were fully effective through but one feeding period, the new baits, described herein, were effective through many feeding periods. This, as already indicated, is probably due to the hygroscopic character of the new baits. Such baits tend to pick up and retain the moisture or dew of the morning and evening hours, thus rendering the bait soft and succulent.

In such field tests, there was a larger increase in the number of dead grasshoppers in the areas adjacent the improved baits than in the corresponding areas adjacent the older types of baits.

It has been found additionally that the incorporation of calcium chloride, and similar highly hygroscopic substances, in arsenical baits improves the effectiveness of such baits. In an arsenical bran these hygroscopic substances apparently function in a similar manner to that described, namely, they absorb or imbibe water and retain it in the bait. It is particularly to be observed that, in producing arsenical baits under the present invention, considerably more calcium chloride may be employed than is the case with the magnesium sulfate baits. This is due to the fact that the calcium ion appears to have no antagonistic effect on the arsenical.

Again, as noted hereinbefore, when hygroscopic substances other than calcium chloride, or readily ionizable inorganic salts, are employed, the quantity used may be very considerably increased. For example, baits may be made up which are characterized by an improved efficiency by adding glycerin, ethylene glycol, or the like, in relatively large amounts, i. e., in excess of the 10 per cent. mentioned hereinbefore.

In the course of this research it was discovered that particularly effective baits may be produced by incorporating an appreciable amount of hygroscopic toxic agent in an arsenical insecticide. It was found specifically that the efficiency of arsenical baits may be increased very considerably by incorporating therein a given amount of magnesium sulfate. The magnesium sulfate itself is somewhat hygroscopic and thus, as explained, tends to keep the arsenical-containing bait moist and succulent. In addition to this, the mixture is characterized by a balanced toxicity, so to speak. In actual tests it has been found that the toxic efficiency of the mixture is much greater than that which would be expected of equivalent amounts of the components used separately. This, as indicated is believed to be due to a peculiar correlation of the specific toxic effect of each component. The efficiency of such a form of arsenical bait is further enhanced by incorporating agents, such as calcium chloride, which function to maintain the mass in a moist condition. While the relative proportions of the components may be varied widely, a combination which in practice has been found to be very effective comprises (dry basis) substantially twenty percent of a suitable arsenical, substantially seventy percent of magnesium sulfate and substantially ten percent of calcium chloride or equivalent agent.

It will be appreciated that, when making up insecticidal products according to the present invention, spreaders such as sawdust, and the like, may be incorporated in the mash and, if desired, other toxic agents. Similarly, as indicated in the examples given, nutrient agents, such as molasses and the like, may be added to render the bait more luring to the pests to be destroyed. The benefit inherent in the employment of calcium chloride, and equivalent agents, is imparted to the entire mass, serving, as noted, to retain a relatively large percentage of water in the mass, despite relatively elevated temperatures, and thus to maintain the mass in a moist, succulent and tempting condition.

While preferred embodiments of the invention have been described, it is to be understood that these are given to illustrate the underlying principles involved. Insecticidal compounds may be produced having one or more of these beneficial hygroscopic adjuvants and, as indicated, one or more toxic compounds, provided the amount of the adjuvant is maintained within the limits noted, that is to say, below that quantity which would seriously inhibit the toxicity of the effective poison. The compounds described and other similar insecticides which are characterized by the same type of diurnal revivification are considered to be comprehended within the present disclosure.

We claim:

1. An insecticidal bait which comprises a bran mash in which is incorporated magnesium sulfate and calcium chloride, the amount of the calcium chloride being less than 10 per cent. of the dry ingredients of the composition.

2. An insecticidal bait which comprises a bran mash in which is incorporated a nutrient agent comprising molasses, a toxic agent comprising magnesium sulfate and calcium chloride, the amount of the calcium chloride being no more than 10% of the magnesium sulfate.

3. A method of increasing the efficiency of bran mash arsenical baits which comprises incorporating therein a predetermined amount of magnesium sulfate and calcium chloride, the amount of the calcium chloride being not more than substantially 10% of the magnesium sulfate.

4. An insecticidal bait which includes a bran mash in which is incorporated a toxic mixture comprising, substantially twenty percent of an arsenical, substantially seventy percent of magnesium sulfate and substantially ten percent of calcium chloride.

5. That method of improving insecticidal baits composed of a bran mash containing magnesium sulfate which comprises adding calcium chloride thereto in an amount not exceeding substantially one third that of the magnesium sulfate.

6. An insecticidal bait comprising substantially seventy five percent of a bran mash and substantially twenty five percent of a mixture comprised of substantially three parts of magnesium sulfate and one part of calcium chloride.

LEO M. CHRISTENSEN.
HARRY MILLER.